United States Patent [19]

Knapp et al.

[11] Patent Number: 5,474,454

[45] Date of Patent: Dec. 12, 1995

[54] OWN SHIP SENSOR SYSTEM SIMULATOR

[75] Inventors: Gregory F. Knapp; Susan L. Anderson, both of Virginia Beach, Va.

[73] Assignee: The United States of America as represented by the Secretary of the Navy, Washington, D.C.

[21] Appl. No.: 194,434

[22] Filed: Feb. 10, 1994

[51] Int. Cl.⁶ .................................................. G09B 19/00
[52] U.S. Cl. ............................... 434/29; 434/25; 364/578
[58] Field of Search ................................. 434/25, 26, 29, 434/38, 60, 118, 365; 364/578; 395/200, 250, 275, 725; 114/257, 312; 370/85.1

[56] References Cited

U.S. PATENT DOCUMENTS

| | | | |
|---|---|---|---|
| 4,079,372 | 3/1978 | Koenig | 341/100 |
| 5,017,141 | 5/1991 | Relf et al. | 434/29 |
| 5,129,062 | 7/1992 | Gygi et al. | 395/250 |
| 5,220,512 | 6/1993 | Watkins et al. | 364/578 X |
| 5,230,628 | 7/1993 | Kaneko et al. | 434/118 |
| 5,247,468 | 9/1993 | Henricks et al. | 364/578 |
| 5,306,154 | 4/1994 | Ujita et al. | 364/578 X |

*Primary Examiner*—Joe H. Cheng
*Attorney, Agent, or Firm*—Michael J. McGowan; Prithvi C. Lall; Michael F. Oglo

[57] ABSTRACT

A system for simulating own ship sensor outputs for submarine trainers is provided. The system comprises of five personal computer systems operating together. These computers are interconnected such that the individual computers can exchange data and function as one integrated unit. The system provides sensor output to an external trainer through multiple STANAG, NTDS, DIGITAL™ I/O, and DIGITAL-SYNCHRO™ I/O cards. The system also accepts trainer inputs on these lines. Software modules on the personal computer systems allow the operator to configure and monitor the sensor systems as well as providing processing of inputs received at multiple sources to generate a coherent output signal.

9 Claims, 7 Drawing Sheets

| PC | Type (Designation) | Direction | Simulates | Signals |
|---|---|---|---|---|
| PC-1(200) | STANAG (203/204) | IN/OUT | IDU-1A | - |
| | STANAG (205/206) | IN/OUT | IDU-1B | - |
| PC-2(300) | STANAG (303/304) | IN/OUT | IDU-2A | - |
| | STANAG (305/306) | IN/OUT | IDU-2B | - |
| PC-3(400) | NTDS (403) | IN | ESGN 1-1 | - |
| | NTDS (406) | OUT | ESGN 1-1 | - |
| | NTDS (409) | IN | ESGN 1-2 | - |
| | NTDS (412) | OUT | ESGN 1-2 | - |
| | NTDS (415) | IN | ESGN 2-1 | - |
| | NTDS (418) | OUT | ESGN 2-1 | - |
| | NTDS (421) | IN | ESGN 2-2 | - |
| | NTDS (424) | OUT | ESGN 2-2 | - |
| PC-4 (500) | STANAG (503/504) | IN/OUT | WSN/GYRO | - |
| | STANAG (506) | IN | EDI | - |
| PC-5 (600) | Digital Multi (603) | Bi | - | To DIU (700) |
| | Digital Multi (606) | Bi | - | To DIU (700) |
| | Synchro Multi (609) | Bi | - | To SCU (800) |
| | Synchro Multi (612) | Bi | - | To SCU (800) |
| | STANAG (615/616) | IN/OUT | WSN/GYRO | - |
| DIU (700) | Digital I/O (703) | Bi | - | Mast, Bow, RD Mark |
| | Digital I/O (706) | Bi | - | 18B, 2F Mast, 2F Mark |
| | Digital I/O (709) | Bi | - | 18B Mark |
| | Digital I/O (712) | Bi | - | EM Log MOD, Rodmeter |
| SCU (800) | Synchro I/O (803) | Bi | - | Stern, Rudder |
| | Synchro I/O (806) | Bi | - | 2FIX, 36X Radar Range, Radar Bearing |
| | Synchro I/O (809) | Bi | - | Bow, EM Log 40 |
| | Synchro I/O (812) | Bi | - | 18B1X, 36X, EM Log 100 |

FIG. 4

| Signal | Valid States |
| --- | --- |
| RDF Mast | In Transit, Up, Down, Faired |
| Multipurpose Antenna 1 | In Transit, Up, Down, Faired |
| Multipurpose Antenna 2 | In Transit, Up, Down, Faired |
| Periscope 2F Fairing | In Transit, Up, Down, Faired, Invalid |
| Periscope 18B Fairing | In Transit, Up, Down, Faired, Invalid |
| Radar Mast | In Transit, Up, Down, Invalid |
| Snorkel Mast | In Transit, Up, Down, Invalid |
| Navigation Light Mast | In Transit, Up, Down, Invalid |
| Periscope 2F Status | Up, Down |
| Periscope 18B Status | Up, Down |
| Bow Planes | Housed, Extended |
| EM LOG Speed | 0-99 (knots) |
| EM LOG Mode | LOG, Other |
| EM LOG Sensor | Rodmeter 1, Rodmeter 2 |
| Radar Range | 0-72000 (yards) |
| Radar Bearing | 0-360 (degrees) |
| Radar Mark | Off, 15 (seconds), 30 (seconds) |
| Fail EDI | Off, On |
| Stern Plane Angle | -27 to +27 (degrees) |
| Rudder Angle | -37 to +37 (degrees) |
| Bow Plane Angle | -25 to +25 (degrees) |
| Periscope 2F Bearing | 0-360 (degrees) |
| Periscope 2F Mark | Off, 15 (seconds), 30 (seconds) |
| Periscope 18B Bearing | 0-360 (degrees) |
| Periscope 18B Mark | Off, 15 (seconds), 30 (seconds) |
| Roll | -90 to +90 (degrees) |
| Pitch | -90 to +90 (degrees) |
| Heading | 0-360 (degrees) |
| WSN Mode | Normal, Polar |
| Latitude | 0-360 (degrees), 0-59 (minutes), 0-59 (seconds) |
| Longitude | 0-360 (degrees), 0-59 (minutes), 0-59 (seconds) |
| Failed Output Channel (each WSN) | Off, On |
| Failed Output Channel (each ESGN) | Off, On |
| Failed Testword (each WSN) | Off, On |
| Failed Transfer Count (each WSN) | Off, On |
| Strain Guage A,B,C depth (each IDU) | 0-9999 (feet) |
| Processed Keel Depth (each IDU) | 0-9999 (feet) |
| Ordered Keel Depth (each IDU) | 0-9999 (feet) |
| Processed Keel Depth Valid (each IDU) | Yes, No |
| Failed Testword (each IDU) | Off, On |
| Fail Output (each IDU) | Off, On |

FIG. 6

| Ownership Speed (each WSN) | Inertial Speed (each WSN) |
|---|---|
| Electronic Depth Indicator | Keel Depth (each ESGN) |
| Roll | Pitch |
| Heading | Speed |
| Ownship Speed (each IDU) | Ownship Roll (each IDU) |
| Ownship Pitch (each IDU) | Ownship Heading (each IDU) |
| Bow Plane Angle (each IDU) | Stern Plane Angle (each IDU) |
| Rudder Angle (each IDU) | Bottom Sounder Depth (each IDU) |

FIG. 7

OWN SHIP SENSOR SYSTEM SIMULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to the field of submarine simulators. In particular, it is a system for simulating the analog and digital inputs, outputs, or interfaces of submarine based sensor systems.

(2) Description of the Prior Art

Submarine simulators were developed many years ago to provide a realistic operating environment for training while minimizing the real hardware costs involved. These simulators have been constructed in a modular fashion, wherein one unit provides low level own ship sensor outputs. A second unit interprets these outputs and provides a realistic human interface for the operator. One example of this type of technology is the AN/BSY-1(V) Maintenance Trainer. The maintenance trainer relies upon a separate discreet Sensor Simulator Unit to provide low level ship sensor data, such that the trainer emulates deployed tactical hardware.

In the prior art, the low level ship sensor simulator has been an extremely computer intensive component. Because of this requirement, previous simulators have been based on the combination of mainframe computer hardware and software. Mainframe computer technology, first introduced in the 1960's, is expensive and unreliable due to the high degree of complexity of the computational architecture. Prior art ship sensor simulators have inherited these weaknesses from the technology upon which they are based.

SUMMARY OF THE INVENTION

Accordingly, it is an object of the present invention to provide an own ship sensor simulator capable of providing the sensor interfaces necessary for a submarine trainer.

It is a further object of the present invention to provide this system using low cost, high reliability components.

Another object of the present invention is to base the computing core of the system upon personal computer technology.

In accordance with the foregoing and other objects of the invention, a complete system for generating own ship sensor interfaces for a trainer is provided. The system provides own ship sensor interfaces from the following simulated devices: Ship Control Panel, Electrostatically Suspended Gyro Navigator, Gyrocompass, Periscopes, Ballast Control Panel, Depth Indicators, and Ship Radar. In addition, signals are provided for ship speed, bow plane angle, stern plane angle, and rudder angle. The simulator provides the system operator with an interface for monitoring and altering the sensor outputs.

BRIEF DESCRIPTION OF THE DRAWINGS

The foregoing objects and other advantages of the present invention will be more fully understood from the following detailed description and reference to the appended drawings wherein:

FIG. 4 is a table of the ship sensor signals provided by each component of the own ship sensor simulator;

FIG. 6 is a table of the sensor input configurable values provided by the man-machine interface module; and FIG. 7 is a table of the sensor output values which can be monitored through the man-machine interface module.

DESCRIPTION OF THE PREFERRED EMBODIMENT

Figure 1:
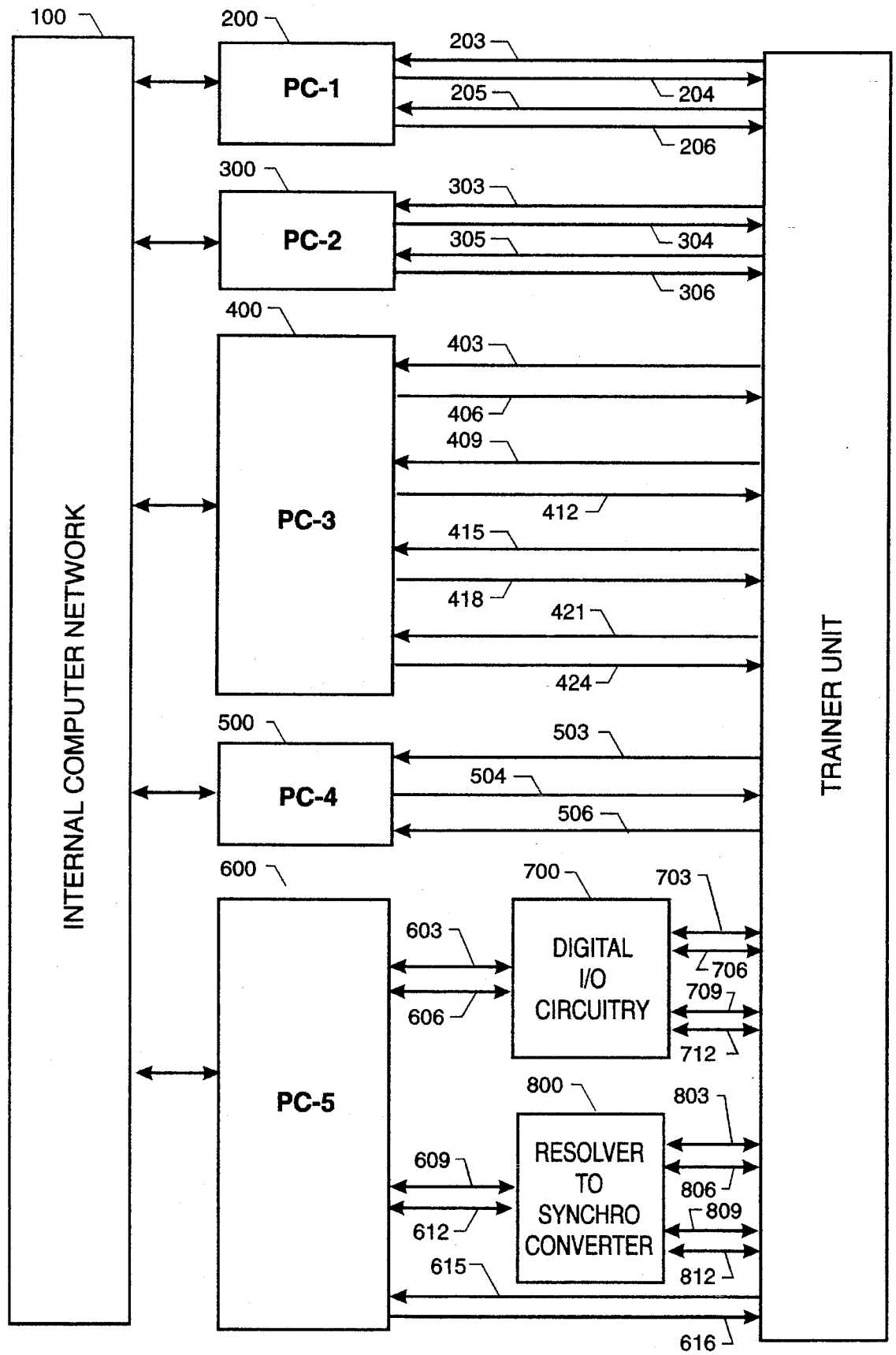
FIG. 1 is a block diagram of the complete own ship sensor simulator system.

Referring now to the drawings, and in particular to FIG. 1, one embodiment is shown of the own ship sensor simulation system. The system comprises five computational engines 200, 300, 400, 500, and 600. In the preferred embodiment, five INTEL-80386 based single board computers are used. These personal computers are interconnected through an Internal Computer Network 100. This network allows the personal computers to exchange data and function as one integrated unit to provide own ship sensor signals to the external trainer unit through the output sensor lines 204, 206, 304, 306, 406, 412, 418, 424, 504, and 616. External input is accepted from the external trainer unit through input sensor lines 203, 205, 303, 305, 403, 409, 415, 421, 503, 506 and 615. Digital multiplexed input/output lines 603 and 606 drive digital input/output circuitry 700 which provides output and accepts input on bi-directional digital input/output lines 703, 706, 709, 712. Synchro multiplexed input/output lines 609 and 612 drive resolver to synchro converter 800 which provides synchro output and accepts synchro input through bi-directional synchro lines 803, 806, 809, and 812. The external trainer unit is not part of the present invention and is depicted in FIG. 1 only to show its relation to the present invention.

Figure 2:
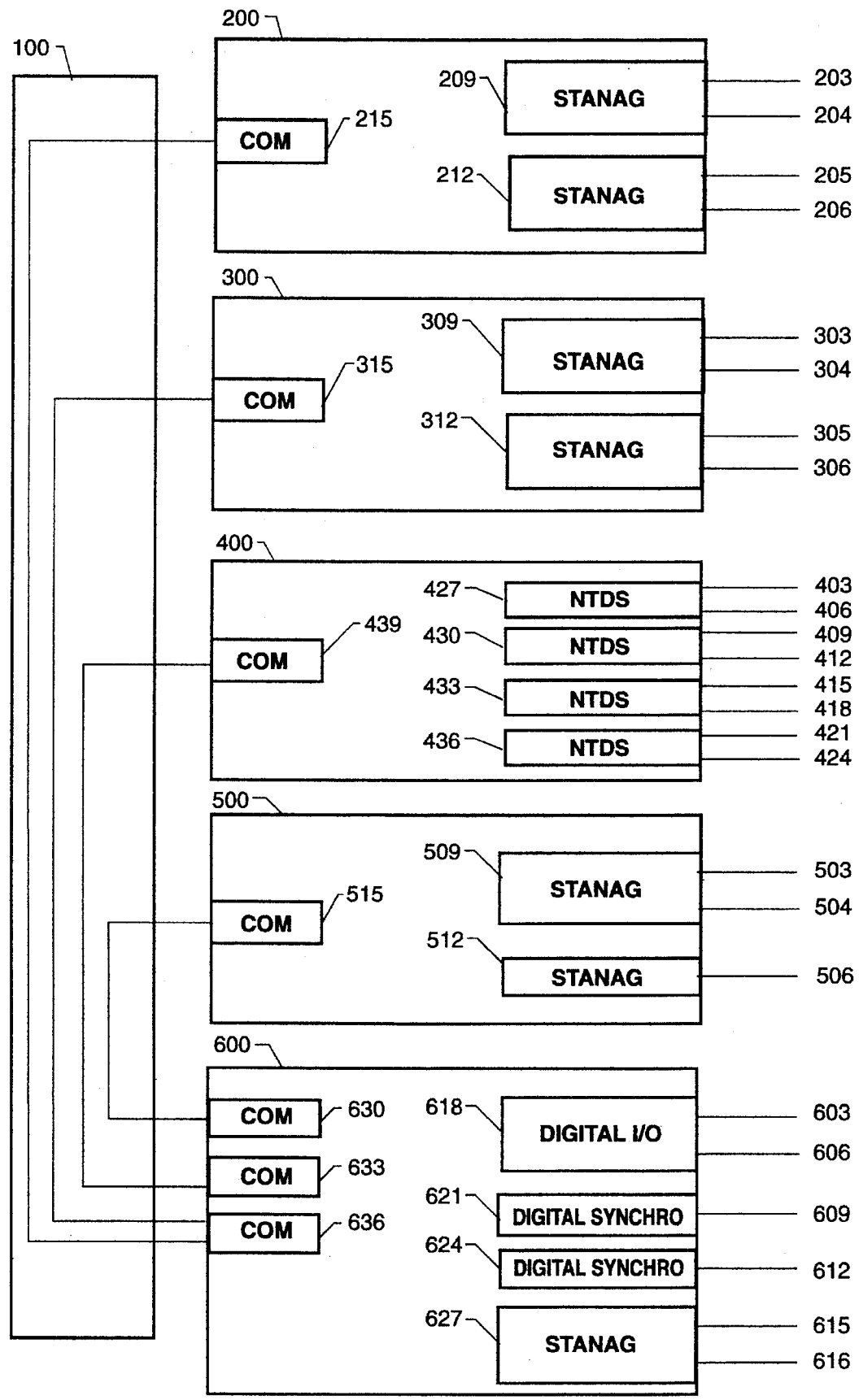
FIG. 2 is a block diagram of the components of each personal computer system in the system.

Referring now to FIG. 2, the internal configuration for each personal computer in the complete system is detailed. Personal computer 200 contains two Standard NATO Agreement (STANAG) interface cards. STANAG card 209 drives input line 203 and output line 204. STANAG card 212 drives input line 205 and output line 206. Personal computer 200 also contains single port communications card 215 which connects through Internal Computer Network 100 to personal computer 600.

Personal computer 300 contains two STANAG interface cards 309 and 312 which drive STANAG input line 303/output line 304 and STANAG input line 305/output line 306 respectively. Single port communications card 315 connects personal computer 300 to personal computer 600 through Internal Computer Network 100.

Personal computer 400 contains four Navy Tactical Data System (NTDS) interface cards 427, 430, 433, and 436. Each of these cards provides one input line and one output line with lines 403 and 406 being connected to card 427, lines 409 and 412 being connected to card 430, lines 415 and 418 being connected to card 433 and lines 421 and 424 being connected to card 436. Personal computer 400 is connected by single port communications card 439 through Internal Computer Network 100 to personal computer 600.

Personal computer 500 contains two STANAG interface cards 509 and 512 which drive STANAG input line 503 and output line 504 and STANAG input line 506. Single port communications card 515 provides connectivity through Internal Computer Network 100 to personal computer 600.

Personal computer 600 contains digital input/output card 618 which drives two multiplexed digital input/output lines 603 and 606. Personal computer 600 also contains two DIGITAL-SYNCHRO input/output cards 621 and 624 which drive synchro multiplexed input/output lines 609 and 612 respectively. A single STANAG interface card 627 drives STANAG input line 615/output line 616. Finally, cards are provided to communicate with all other personal computers in the system through Internal Computer Network 100. Two single port communication cards 630 and 633 interconnect to personal computers 200 and 300 respectively. A dual port communications card 636 interconnects to the remaining personal computers 400 and 500.

Figure 3:
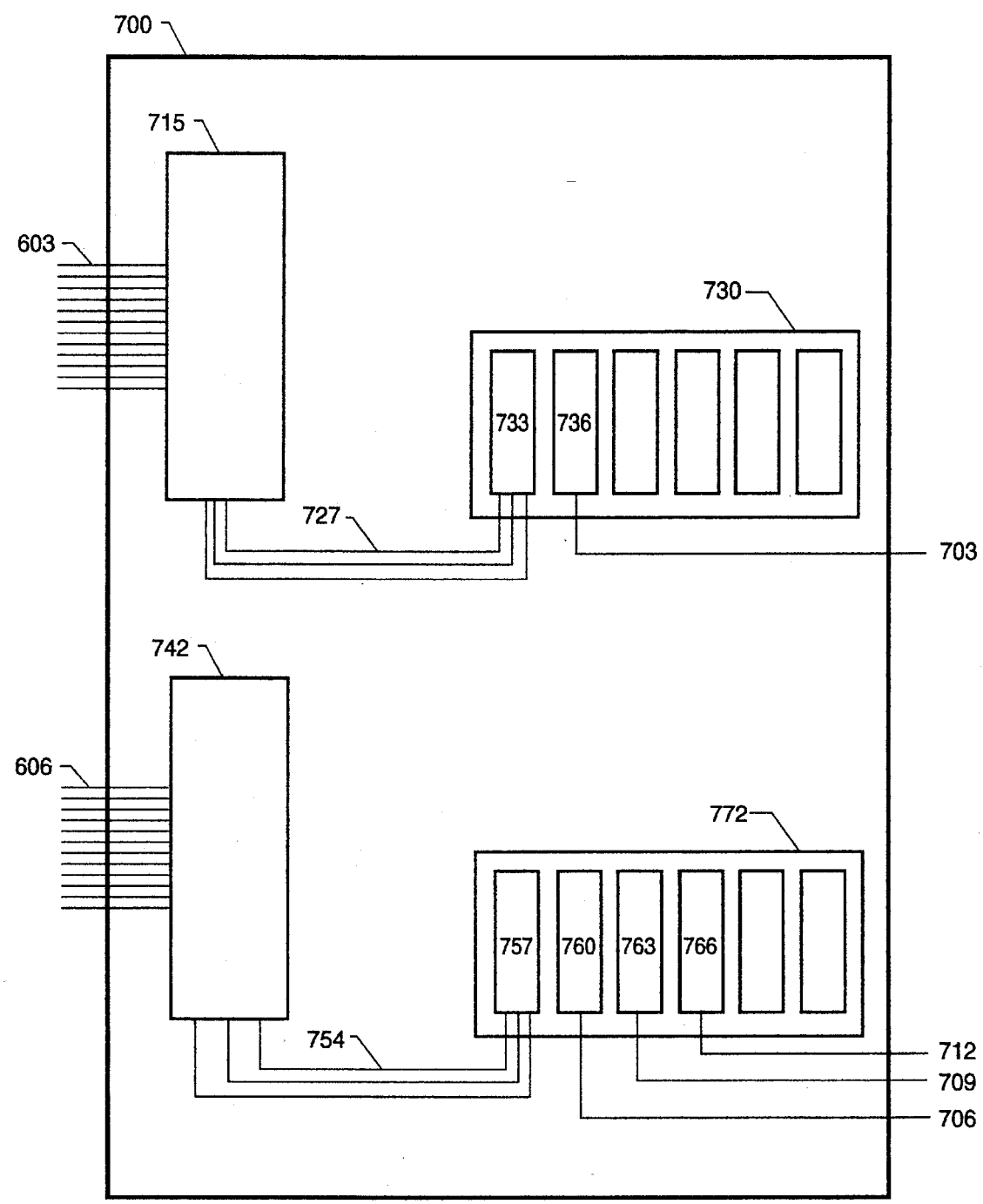
FIG. 3 is a circuit diagram of the digital input/output unit.

Referring now to FIG. 3, a circuit diagram of the digital input/output circuitry 700 is provided. Two multiplexed digital input/output lines 603 and 606 connect digital input/output circuitry 700 to the rest of the system. The purpose of this circuit is to simulate discreet analog switches contained in various submarine sensors. These two lines terminate on 24 channel output blocks 715 and 742. The output signals are jumpered from 24 channel output blocks 715 and 742 through output cabling 727 and 754 to output terminal blocks 733 and 757 on terminal connectors 730 and 772. Internally, terminal connector 730 connects output terminal block 733 to external terminal block 736. Digital I/O line 703 is directly connected to external terminal block 736. Internally, terminal connector 772 connects output terminal block 757 to each external terminal block 760, 763, and 766. Digital I/O lines 706, 709, and 712 are connected to external terminal blocks 760, 763, and 766 respectively.

Referring now to FIG. 4, the signals provided by each component in the complete system are summarized. Personal computer 200 provides Standard NATO Agreement Interface (STANAG) data input lines 203 and 205 and data output lines 204 and 206, simulating the own ship primary Indicator Drive Unit (IDU). Personal computer 300 provides STANAG data input lines 303 and 305 and data output lines 304 and 306 simulating the own ship secondary IDU. Input lines 203, 205, 303 and 305 accept input corresponding to the ship heading, speed, roll, pitch, plane/rudder angle, and bottom sound depth. Output lines 204, 206, 304 and 306 provide sensor outputs corresponding to the three strain gauge readings, processed depth, and ordered depth. Personal computer 400 provides Navy Tactical Data System (NTDS) input lines 403, 409, 415 and 421 and NTDS output lines 406, 412, 418 and 424. These eight lines simulate the inputs and outputs of the ship Electrostatically Suspended Gyro Navigation system (ESGN) to onboard ship's central computer (designated as the UYK-7 or UYK-43). The ESGN provides roll, pitch, heading, and speed signals to the trainer and accepts depth and synchronization inputs. Personal computer 500 provides two STANAG input lines. Input line 503 accepts input corresponding to ownship speed for the (WSN-2A) Gyrocompass. Output line 504 provides gyrocompass outputs corresponding to roll, pitch and heading. Input line 506 accepts input for the Electronic Depth Indicator. Personal computer 600 provides two multiplexed digital input/output lines 603 and 606, multiplexed synchro input/output lines 609 and 612, and STANAG input/output lines 615 and 616. The two multiplexed digital input/output lines 603 and 606 are divided into four digital input/output lines 703, 706, 709, and 712 by digital input/output circuitry 700. Digital I/O line 703 provides mast, bow, and radar mark sensor signals. Digital I/O line 706 provides periscope 18B mast, periscope 2F mast, and periscope 2F mark sensor signals. Digital I/O line 709 provides periscope 18B mark sensor signals. Finally, digital I/O line 712 provides EM LOG signals and rodmeter simulation. The two multiplexed synchro input/output lines 609 and 612 are divided into four synchro input/output lines 803, 806, 809, and 812 by resolver to synchro converter 800. Synchro I/O line 803 provides stern and rudder sensor signals. Synchro I/O line 806 provides the 2F1X, 36X, radar range and radar bearing signals. Synchro I/O line 809 provides bow and EM LOG 40 sensor signals. Synchro I/O line 812 provides the 18B1X, 36X, and EM LOG 100 sensor signals.

Figure 5:
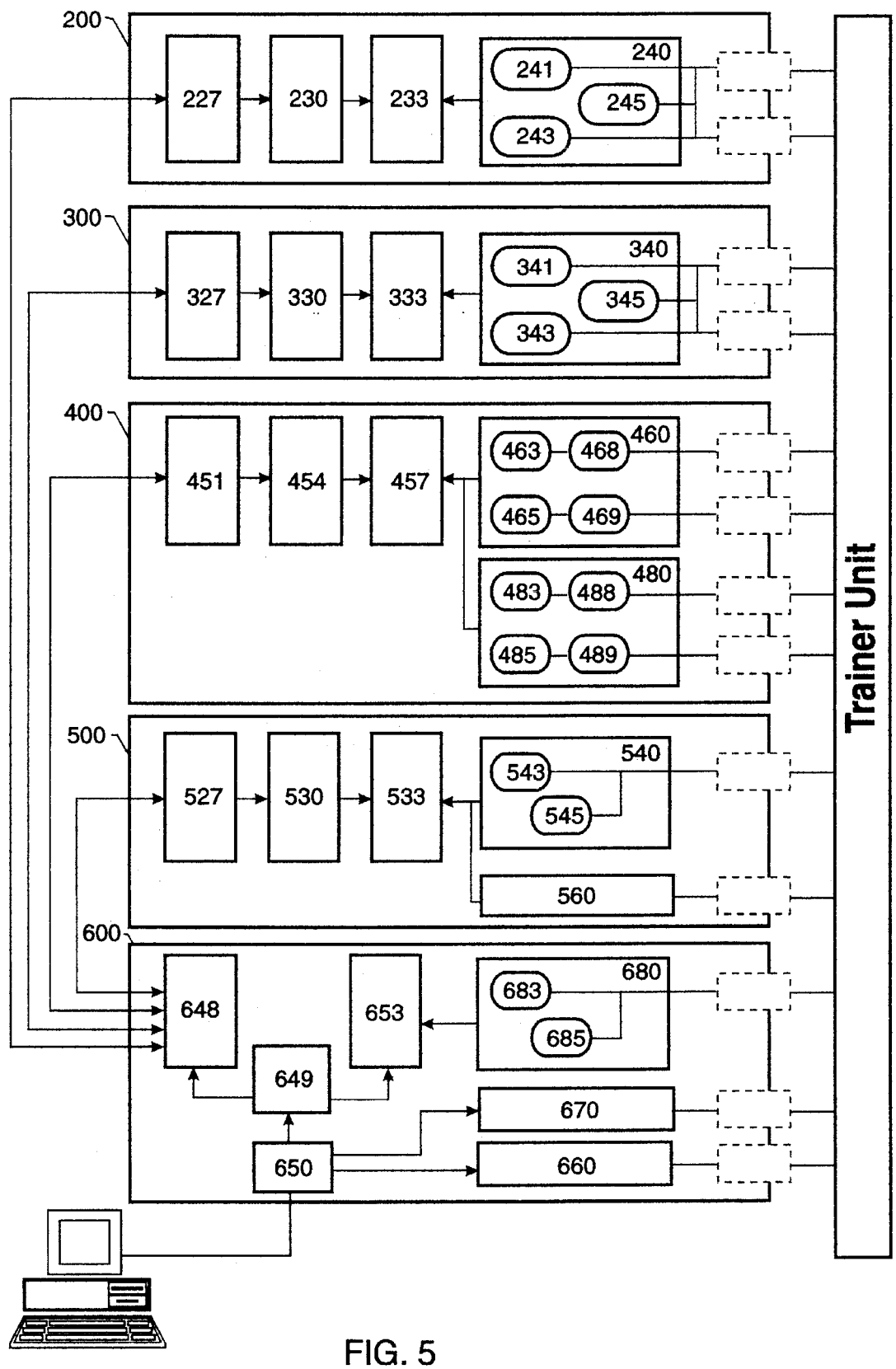
FIG. 5 is a block diagram of the software modules of the own ship sensor simulator system.

Referring now to FIG. 5, a block diagram of the software modules within the complete own ship sensor simulator system is provided. Flow of data is bi-directional from computer 600 to each secondary computer and on to its simulation. The arrows on the figure show the module that controls the passing and/or requesting of data from other modules within the data flow path. Each of the personal computers 200, 300, 400, 500, and 600 contain a software module responsible for reading and writing data across the internal computer network. These modules 227, 327 451, 527, and 648 execute the proper RS-232 network protocol and manages the message transfer across the RS-232 hardware interface. This data is retrieved by the primary managing software module within each computer where the data is properly interpreted and passed to the proper data repository region. Modules 230, 330, 454, and 530 control this function for computers 200, 300, 400 and 500 respectively. In computer 600, module 650 controls this function along with the man-machine interface functionality which allows the sensor input and output values for each component to be manually configured or monitored by an operator. Computer 600 also includes a network manager, software module 649, that codes or decodes the data for its final designation. The data repository regions are controlled by modules 233, 333,457, 533 and 653. These modules allow the dynamic simulations 240, 340, 460, 480, 540, 560, and 680 access to operator inputs and requests. Computer 600 manages the synchro analog signals through module 660 and digital switch signals through module 670. Computer 600 also simulates the WSN-2B gyrocompass via module 680. Module 680 contains two separate modules 683 and 685, that collectively manage the message traffic across a STANAG 4156 hardware interface: 683 receives input data and 685 sends output data. Modules 240 and 340 operate as an Indicator Drive Unit (IDU) within computer 200 and 300, respectively. These modules contain two modules (241 and 243) and (341 and 343) respectively that retrieve data from the trainer unit via STANAG 4156 interface cards. Modules 245 and 345 provide data to the trainer unit across the dynamically selected STANAG hardware interface. Computer 400 provides two identical ESGN dynamic simulations, modules 460 and 480. Modules 463, 465, 483 and 485 control the timing sequence inherent in an ESGN component. They alert their respective channel control modules 468, 469, 488, and 489 who manage the appropriate input/output data sequence from and to the trainer unit. Computer 500 provides a WSN-2A gyrocompass simulation via software module 540 and an Electronic Depth Indicator simulation via software module 560. Module 540 contains two separate modules 543 and 545, that collectively manage the message traffic across a STANAG 4156 hardware interface. Module 543 receives input data and module 545 sends output data. Module 560 reads the input data supplied to it by the trainer unit.

Referring now to FIG. 6, a table of the sensor input signals controlled by the man-machine interface module and their accepted values are detailed. Each of these values may be selected and manually set, independent of actual incoming data, through the man-machine interface. The man-machine interface can also be used to monitor the values of the output sensor data. The output sensor data is summarized in FIG. 7.

The STANAG, NTDS, DIGITAL I/O, and I/O cards are all standard personal computer cards readily available in the prior art, and do not comprise novel features of the present invention. The Resolver to Synchro Converter is readily available in the prior art and does not comprise a novel feature of the present invention. However, the placement and utilization of each of these components within the present invention represent novel features of the present invention. It will be understood that many additional changes in the details, materials, steps, and arrangement of parts, which have been herein described and illustrated in order to explain the nature of the invention may be made by those skilled in the art within the principal and scope of the invention as expressed in the appended claims.

What is claimed is:

1. A system for simulating own ship submarine sensor signals comprising:
    a plurality of single board computers connected by an internal computer network;
    means, connected to said plurality of single board computers, for receiving simulated data for the ship control panel, electrostatically suspended gyro navigator, gyrocompass, periscopes, ballast control panel, depth indicators, ship radar, ship speed, bow plane angle, stern plane angle, and rudder angle from an external trainer unit;
    means, connected to said plurality of single board computers, for generating outgoing sensor data; and
    a plurality of Standard NATO Agreement (STANAG) data interface cards, connected to said means for generating, and transmitting data to said external trainer unit.

2. A system for simulating own ship submarine sensor signals as in claim 1 wherein said plurality of single board computers comprises five INTEL™-80386 based single board computers.

3. A system for simulating own ship submarine sensor signals as in claim 1 wherein said means for receiving simulated data further comprises a plurality of Standard NATO Agreement (STANAG) data interface cards.

4. A system for simulating own ship submarine sensor signals as in claim 1 wherein said means for receiving simulated data further comprises a plurality of Navy Tactical Data System (NTDS) data interface cards.

5. A system for simulating own ship submarine sensor signals as in claim 1 wherein said means for receiving simulated data further comprises a plurality of multiplexing I/O data interface cards.

6. A system for simulating own ship submarine sensor signals as in claim 1 wherein said means for receiving sensor data further comprises a plurality of multiplexing synchronized I/O data interface cards.

7. A system for simulating own ship submarine sensor signals as in claim 6 wherein said plurality of single board computers has a direct connection to an operator for configuring sensor outputs.

8. A system for simulating own ship submarine sensor signals comprising:
    a plurality of single board computers connected by an internal computer network;
    means, connected to said plurality of single board computers, for receiving data for ship control panel, electrostatically suspended gyro navigator, gyrocompass, periscopes, ballast control panel, depth indicators, ship radar, ship speed, bow plane angle, stern plane angle, and rudder angle from an external trainer unit;
    means, connected to said single board computers, for generating outgoing sensor data; and
    a plurality of Navy Tactical Data System (NTDS) data interface cards, connected to said means for generating, and transmitting data to said external trainer unit.

9. A system for simulating own ship submarine sensor signals comprising:
    a plurality of single board computers connected by an internal computer network;
    means, connected to said plurality of single board computers, for receiving data for ship control panel, electrostatically suspended gyro navigator, gyrocompass, periscopes, ballast control panel, depth indicators, ship radar, ship speed, bow plane angle, stern plane angle, and rudder angle from an external trainer unit;
    means, connected to said single board computers, for generating outgoing sensor data; and
    a plurality of multiplexing synchronized I/O data interface cards connected to said means for generating, and transmitting data to said external trainer unit.

* * * * *